US008306068B2

(12) United States Patent  (10) Patent No.: US 8,306,068 B2
Sokolov et al.  (45) Date of Patent: Nov. 6, 2012

(54) SYSTEM FOR DATA COLLECTION THROUGH AN ALTERNATE CURRENT SUPPLY NETWORK

(75) Inventors: Yuri Borisovich Sokolov, Tsentralnaya (RU); Valery Viktorovich Saharov, Tropinina (RU)

(73) Assignee: DIS Plus Ltd, Moscow (RU)

( * ) Notice: Subject to any disclaimer, the term of this patent is extended or adjusted under 35 U.S.C. 154(b) by 1158 days.

(21) Appl. No.: 10/578,117

(22) PCT Filed: Oct. 7, 2004

(86) PCT No.: PCT/RU2004/000389
§ 371 (c)(1),
(2), (4) Date: May 1, 2006

(87) PCT Pub. No.: WO2005/043773
PCT Pub. Date: May 12, 2005

(65) Prior Publication Data
US 2007/0121675 A1    May 31, 2007

(30) Foreign Application Priority Data

Oct. 31, 2003  (RU) .................................. 2003131977

(51) Int. Cl.
*H04J 3/06*  (2006.01)
(52) U.S. Cl. ...................................................... 370/503
(58) Field of Classification Search ................. 370/503; 340/259, 310; 375/219, 227, 257
See application file for complete search history.

(56) References Cited

U.S. PATENT DOCUMENTS

| | | | | |
|---|---|---|---|---|
| 3,479,628 A | * | 11/1969 | De Vaul | 375/351 |
| 4,147,978 A | * | 4/1979 | Hicks | 324/142 |
| 4,245,215 A | * | 1/1981 | O'Connor et al. | 375/259 |
| 4,301,415 A | * | 11/1981 | McFayden | 327/129 |
| 4,348,582 A | * | 9/1982 | Budek | 219/483 |
| 4,514,719 A | * | 4/1985 | Suzuki et al. | 370/503 |
| 4,998,245 A | * | 3/1991 | Tanaka et al. | 370/432 |
| 5,038,140 A | * | 8/1991 | Ikeuchi | 340/825.02 |
| 5,568,511 A | * | 10/1996 | Lampe | 370/341 |
| 5,691,691 A | * | 11/1997 | Merwin et al. | 375/259 |
| 6,002,339 A | * | 12/1999 | Norris | 340/690 |
| 6,021,137 A | * | 2/2000 | Kato et al. | 370/479 |
| 6,784,790 B1 | * | 8/2004 | Lester | 375/239 |
| 2002/0136198 A1 | * | 9/2002 | Findikli | 370/350 |

FOREIGN PATENT DOCUMENTS

| RU | 2178951 | 1/2002 |
|---|---|---|
| SU | 920798 | 4/1982 |

* cited by examiner

*Primary Examiner* — Mark Rinehart
*Assistant Examiner* — Angel Brockman
(74) *Attorney, Agent, or Firm* — Patentbar International, P.C.

(57) ABSTRACT

The invention relates to electrical network communications engineering and can be used in systems for automatic data collection from electric, heat, water, gas meters etc. The technical result is significant simplification of the interior structure of slave units increased noise stability of a system. This result is achieved by using zero crossing points of the fundamental harmonic of system supply line voltage as character synchronization events.

11 Claims, 2 Drawing Sheets

SYSTEM FOR DATA COLLECTION THROUGH AN ALTERNATE CURRENT SUPPLY NETWORK

FIELD OF THE INVENTION

The present invention relates to data collection and communications through alternate current (ac) supply network and can be used for low-speed data acquisition from remote sensors (electric, water, heat meters etc.) and/or to exert control over remote terminal units (street-illuminating lamps, breakers etc.).

DESCRIPTION OF THE RELATED ART

It is known a system for data collection over an ac power line U.S. Pat. No. 6,021,137, Int. Cl. H04J 013/02, issued Feb. 14, 1997), wherein a main unit of a data collection system sends a so-called wideband polling signal simultaneously received and sensed by all system slave units which in response start successive transmission of their data. The main problem of such system is the absence of character synchronization events universal for all network units. This results in the fact that slave units continuously and in real-time mode have to execute complex digital processing of input voltage in search for an initial section of a wideband polling signal. This circumstance imposes high requirements on computational performance of slave units hardware, what complicates and increases considerably the cost of their practical realization.

DESCRIPTION OF THE INVENTION

The present invention solves the problem of creating a noise-suppressing and inexpensive data collection system which could collect data from a plurality of low-speed sensors coupled to an ac power network, such for example as electric, water heat meters etc.

The technical result is material simplification of the interior structure of slave units and increase in noise stability of the system. This technical result in realization of the present invention is achieved because each unit of the data collection system includes, as a part of the hardware, a comparator with hysteresis, the comparator reference input being coupled to the network first wire and the comparator signal input being coupled to the network second wire. The points of comparator state triggering are used as character synchronization events, i.e. for a given unit either serve as a signal starting transmission or reception of each next bit or cause the content of an internal half-cycle counter to increase by one.

A general characteristic of such data sources as electrical, heat, water, gas meters etc. is a rather small amount of information which they create during 24 hours. Thus for example, readings from a standard single-rate and single-phase supply meter are read, as a rule, once every month when power costs are determined. It is clear that an average rate at which a similar meter generates information is very low (about 6 decimal digits per month), so the use of conventional average- and low-speed modems for a network (with transmission rates of several kilobits or even hundreds of bits per second) to collect such slowly varying data is unnecessary and will deliberately result in excessive complexity and low noise stability of such data collection system as compared to theoretically possible ones. A data collection system (FIG. 1) employs one main unit 1 and a plurality of slave units 2, all system units being electrically coupled to a same segment of network 3. The interior structure of the main and slave units is very similar and comprises the following common elements: a protection and signal tracking device 4, a band-pass filter 5, an analog-digital converter (ADC) 6, a low-frequency filter 7, a digital-analog converter (DAC) 8, a comparator with hysteresis 9, an interrupt input 10. The distinction resides in the fact that the system main unit includes a memory block 11, a front-end interface unit 12, a powerful digital signal processor 13 and a communication channel 14; a simpler and less expensive slave unit is built entirely on a general-purpose microcontroller 15 which via a communication channel 16 receives from a local sensor data to be transmitted to the main unit. The system operating frequency band is 20 . . . 95 kHz.

BRIEF DESCRIPTION OF THE DRAWINGS

Materials explaining how to realize a system for data collection through ac supply network and a communications system being formed on its basis are given in the drawings.

DESCRIPTION OF THE PREFERRED EMBODIMENTS

Figure 1:
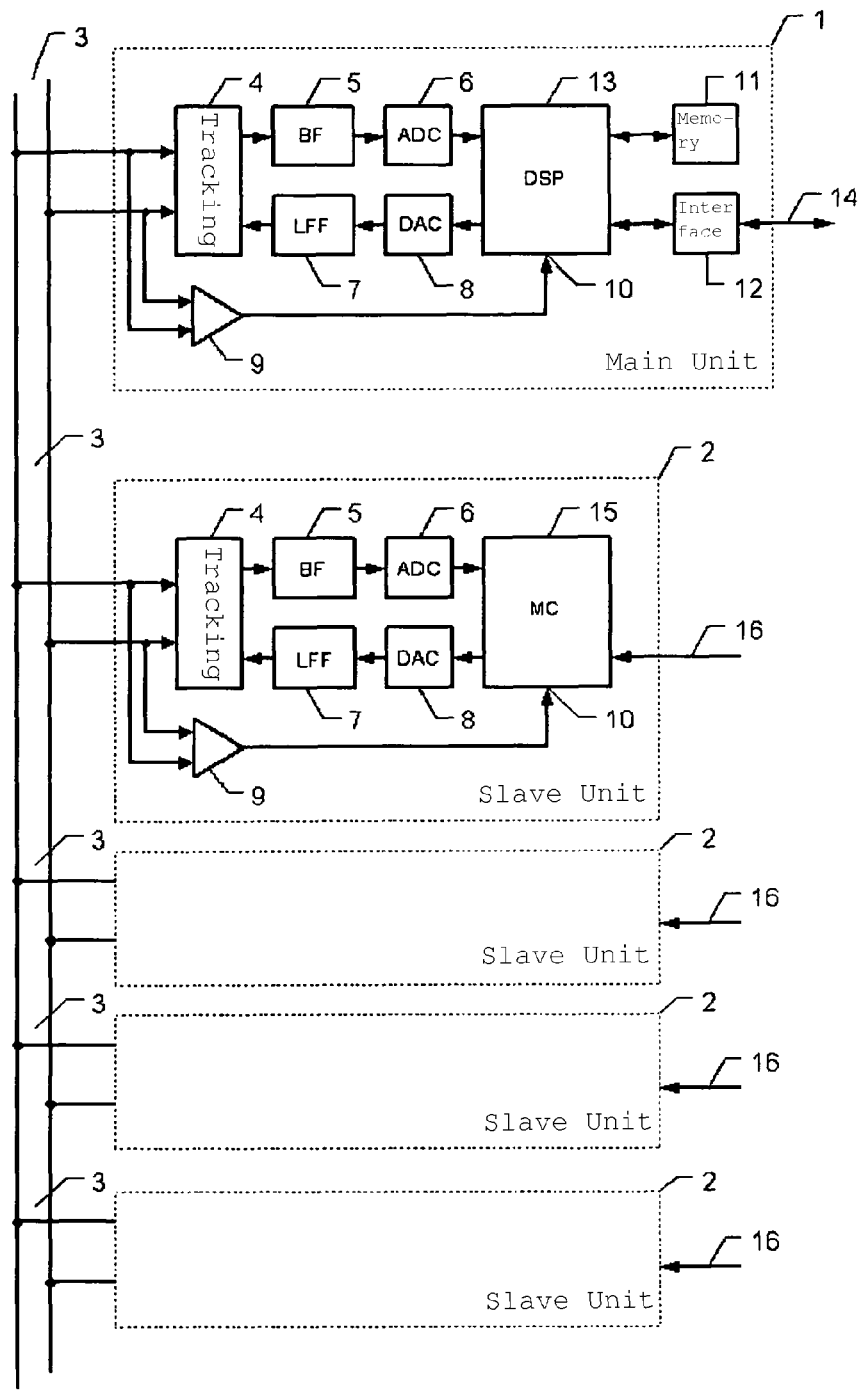
FIG. 1 is a block diagram of a data collection system.
Figure 2:
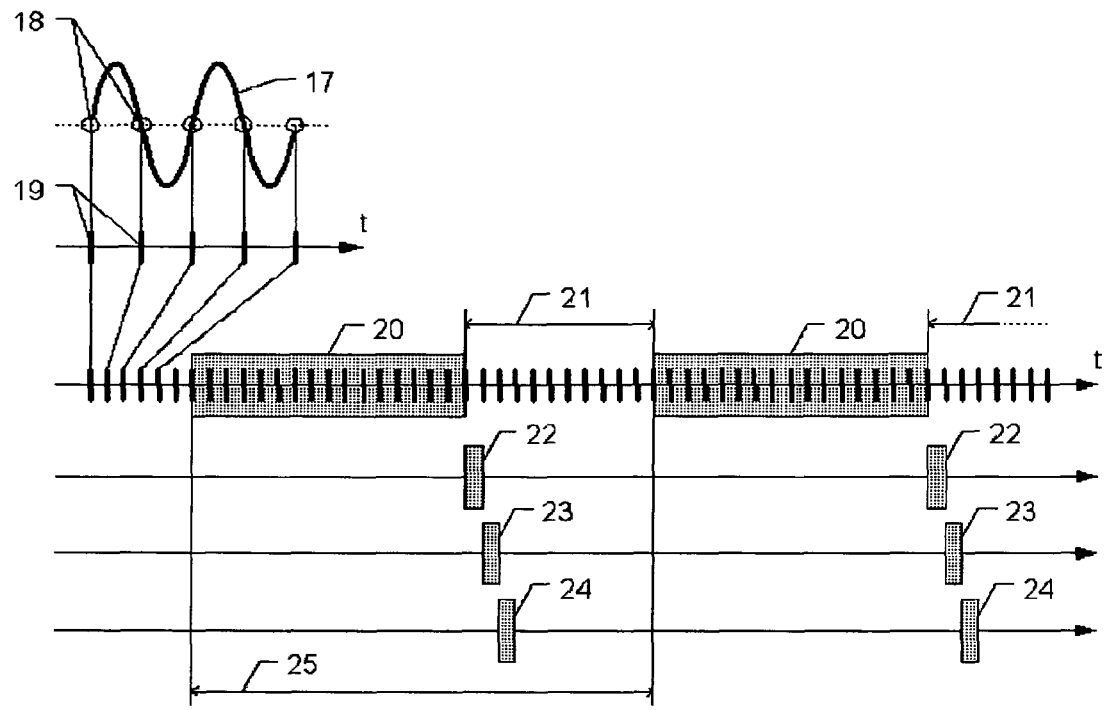
FIG. 2 gives a general structure of interchange in a data collection system.
Figure 3:
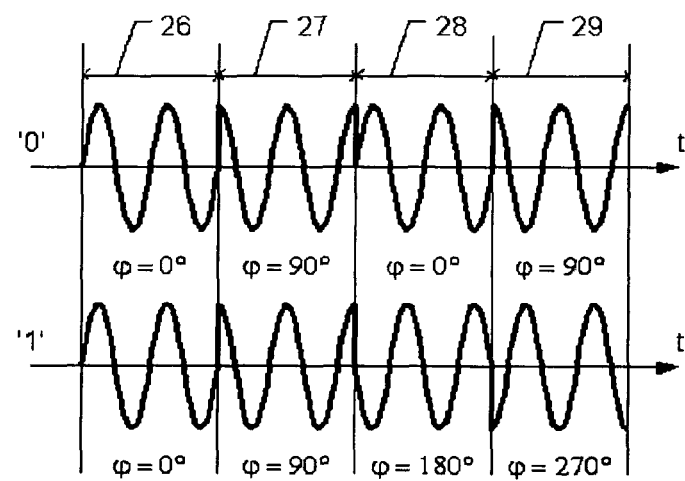
FIG. 3 shows details of a modulation method for a timing signal being sent by a system main unit.

A collection system operates in the following manner (FIGS. 1, 2). Comparators 9 pick out moments when main voltage 17 becomes equal to zero 18, thus generating a sequence of time markers 19 practically synchronous for the whole system, which is used for primary (bit) timing of all units. The system main unit sends a strictly periodical long timing signal 20 which is received and sensed by all system slave units simultaneously. Successive timing signals 20 are interrupted by data transmission intervals 21 during which the system main unit operates only in the reception mode and slave units in the time-shared mode transmit to the main unit their data by one bit at a time in response to each timing signal. In doing so the first slave unit transmits its data 22 in the first bit section of the data transmission interval, the second slave unit transmits its data 23 in the second bit section, the third slave unit transmits its data 24 in the third bit section and so on. The total duration of the data transmission interval is so selected that all system slave units had time enough to send their next bit of data. The timing signal and the data transmission interval together make up one transmission frame 25. To modulate timing signal 20 transmitted by system main unit 1, a method of modified relative phase modulation (FIG. 3) is used. Timing signal 20 is generated by a digital signal processor 13 of the system main unit first in digital form, it is then transformed into step voltage in DAC 8, smoothed in low-frequency filter 7 and via tracking device 4 is delivered to network 3. The timing signal comprises a multiplicity of bit intervals and during these intervals the system main unit transmits specific 256-bit synchronization sequence; each bit is transmitted during one half-cycle of network voltage and is encoded with four successively conveyed sections (chips) of sine wave oscillation 26-29, transmitted data being encoded with a sequence of initial phases for all four chips. A zero of the binary code is transmitted by a sequence of initial phases {0°, 90°, 0°, 90°} and a one—by a sequence {0°, 90°, 180°, 270°}. Such scheme of modulation although less energy-efficient than a conventional binary-chip modulation has an advantage of twofold reduction in receiver computation expenses on signal detection and demodulation, because unlike a conventional scheme it is not necessary in this case to hold simultaneously two channels of signal processing—forward and Q channels. Timing signal spectrum spreading is achieved by use of eightfold cyclic frequency selection of transmitting separate bits according to the linear law, whereas transmission frequencies are selected in such a way that first they should be evenly spaced and second they should evenly fill in the system operating frequency range. Thus, a first bit of the timing signal is transmitted on the first, lowest frequency which is known to every slave unit, a second bit—on the second known to every slave unit frequency and so on to last, highest eighth frequency. After that a sequence of frequency selection is repeated 31 times more to result in transmission of all 256 bits of the synchronization sequence with the use of practically whole operating frequency range.

A bit receiver of slave unit operates in the following manner. A timing signal from network 3 goes through tracking device 4, band-pass filter 5, is further converted to digital form in ADC 6 and is sensed by microcontroller 15 at equal intervals corresponding exactly to a half-cycle of the frequency at which the receiver is tuned at a given time. ADC uneven samples are then added by the microcontroller to the signal battery content and even ones are subtracted from it. At the end of each chip of each bit timing signal being transferred the signal battery content is saved and after that set to zero. Therefore, upon completion of the last fourth chip four numbers $X_1, Y_1, X_2, Y_2$ are found in the microcontroller memory. It is easy to see that taken by pairs these numbers are projections in vector form of a local oscillator signal of the slave unit receiver on the oscillator quadrature axes of the main unit transmitter. In this case, if the system main unit in a given bit interval has transmitted '0', then vectors $\{X_1, Y_1\}$ and $\{X_2, Y_2\}$ will point toward one direction, if '1' has been transmitted, then—in the opposite direction. The slave unit receiver terminates bit demodulation by multiplying vector $\{X_1, Y_1\}$ by adjoint vector $\{X_2, Y_2\}$ in a complex plane, followed by determining the sign of a real part of the product, which in this case will be $X_1X_2-Y_1Y_2$. If the real part sign thus determined is positive, then '0' was transmitted; if it is negative, then it was '1'. The frequency with which the microcontroller samples the input signal and which is equal to a doubled frequency of a signal to be received, varies from one bit to another and follows the same cyclic law as in the transmitter of the system main unit. Timing signal bits demodulated by the receiver then enter a 256-bit serial shift register of the type "the first entered—the last went out". The register content each time a next bit enters the register is compared with the synchronization sequence known to the receiver; and if a number of coincidences exceeds some predetermined threshold which is selected from a given false alarm probability of noise, then the timing signal is assumed to be detected by the receiver. In this case for a next bit interval the receiver linearly modifies its adjustment frequency (frequency sweep) in accord with expected frequency of next bit communication by the system main unit transmitter. The described mechanism of receiver operation makes it possible to discover not only the timing signal itself but also the fact of its modulation. For example, in the simplest case the main unit may transmit the timing signal corresponding either to direct synchronization sequence or inverse one, i.e. the sequence in which all zeros have been replaced with ones and vice versa. In this case the receiver counts a number of coincidences P and at the same time a number of noncoincidences N between the content of the shift register and the known direct synchronization sequence. If either P or N exceeds a predetermined detection threshold, it is considered that the synchronization sequence has been detected by the receiver and simultaneously the main unit has transmitted to all slave units bit values of either '0' or '1', respectively. The slave unit receiver has two basic modes of operation—timing signal search mode and on-link mode. It enters the search mode immediately after power is turned on. The main purpose of this mode is to establish frame synchronism between each slave unit and the system main unit. The slave unit receiver itself operates practically identically in all its modes, the difference is in the fact that in the search mode it operates continuously, periodically modifying initial phase of its frequency sweep to the moment until it coincides with the initial phase of frequency sweep of the main unit transmitter and the first timing signal is received. After that the slave unit transmitter begins to operate periodically, transmitting by one bit for each data transmission interval 21, and the slave unit receiver switches to the on-link mode and is now turned only to confirm the expected presence of timing signal 20 at the beginning of next frame 25. The data containing information on remote sensor state, received by the slave unit via communication channel 16, are conveyed by the slave unit transmitter in form of 64 bit batches by one bit within each frame 25. Batches are continuously transmitted one after another without pause.

To verify whether the present invention complies with the requirements of the inventor's level, an additional search for known features coinciding with the ones different from the prototype has been carried out. Its results show that the present invention to those skilled in the related art does not follow directly from the known level of engineering because solutions which use instead of a polling signal from remote sensors a temporary timing signal (not necessarily always present) sent by a system main unit or some other specially dedicated device are not known.

INDUSTRIAL APPLICABILITY

The above information therefore testifies that the following set of conditions is fulfilled with use of the present invention:
a means embodying the present invention when realized is intended for use in the field of electric network communications and more particularly in systems of data collection from remote sensors;
a possibility of realization of the present invention, as it is characterized in an independent item of the claims, is confirmed by means and methods either cited above or already known before the priority date of the application;
a means embodying the present invention is capable, when realized, of providing the technical result expected by the applicant.

Optionally in some embodiments, in case of temporary absence of timing signal slave units may continue data transmission within "their" half-cycles of network fundamental voltage computing their temporary location from a known half-cycle value of timing signal.

Optionally in some embodiments, an individual device other than a system main unit may be a source supplying a timing signal.

Optionally in some embodiments, a timing signal may be subjected to modulation and may be used for broadcast data transmission from a main unit to slave ones.

Optionally in some embodiments, all signals being transmitted by a main and slave units may have duration equal to ⅓ of a network voltage half-cycle and may be centered about zero crossing points of the fundamental harmonic of system supply line voltage.

The invention claimed is:
1. A system for transmitting data using a network carrying an AC current, comprising:

a timing signal source periodically transmitting phase-coded timing signals comprising one or more phase-coded timing signal symbols and using voltage of the AC current to generate time markers used to determine when each phase-coded timing signal symbol is transmitted and to phase-code each timing signal symbol;

a plurality of numbered slave units, each numbered slave unit receiving at least one phase-coded timing signal and using voltage of the AC current to generate time markers used to determine when each phase-coded timing signal symbol is received and to decode each phase-coded timing signal symbol, each numbered slave unit transmitting a data signal using its number and time when a timing signal is received to determine when to begin transmitting so that data signals from the slave units do not overlap with each other or with the timing signals; and a main unit receiving the data signals from the slave units.

2. The system according to claim 1, wherein, in case of temporary absence of the timing signals, the slave units continue data transmission computing when to begin transmitting using a previously received timing signal.

3. The system according to claim 1, wherein the timing signal source is not the main unit.

4. The system according to claim 1, wherein the timing signal is modulated and used to broadcast data from the main unit to the slave units.

5. The system according to claim 1, wherein all signals being transmitted by the main and slave units have a duration equal to ⅓ of the AC current voltage half-cycle and are centered about zero crossing points of the AC current voltage.

6. The system according to claim 1, wherein the timing signal source is the main unit.

7. The system according to claim 1, wherein each timing signal symbol is transmitted over a half-cycle of the AC current voltage.

8. The system according to claim 1, wherein the start of each timing signal symbol transmission is when the AC current voltage value is zero.

9. The system according to claim 1, wherein each data signal is transmitted over a half-cycle of the AC current voltage.

10. The system according to claim 1, wherein the start of each data signal transmission is when the AC current voltage value is zero.

11. The system according to claim 1, wherein each data signal is transmitted by each N-th numbered slave unit over an N-th half-cycle of the AC current voltage after the end of timing signal.

* * * * *